Figure 10:
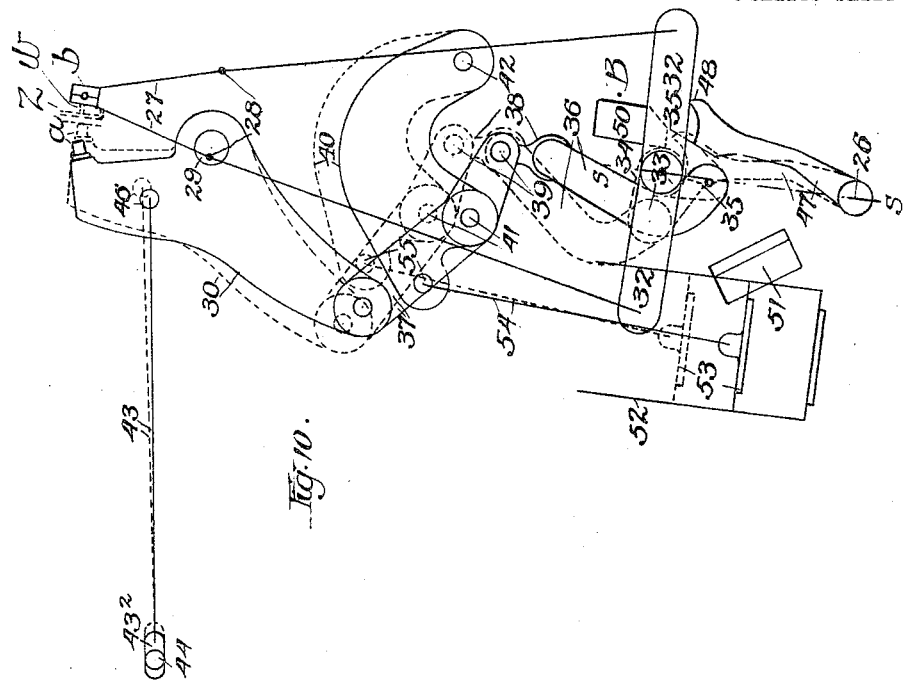

No. 807,539. PATENTED DEC. 19, 1905.
C. BORG.
MACHINE FOR MANUFACTURING METAL WHEELS.
APPLICATION FILED DEC. 21, 1904.
8 SHEETS—SHEET 1.
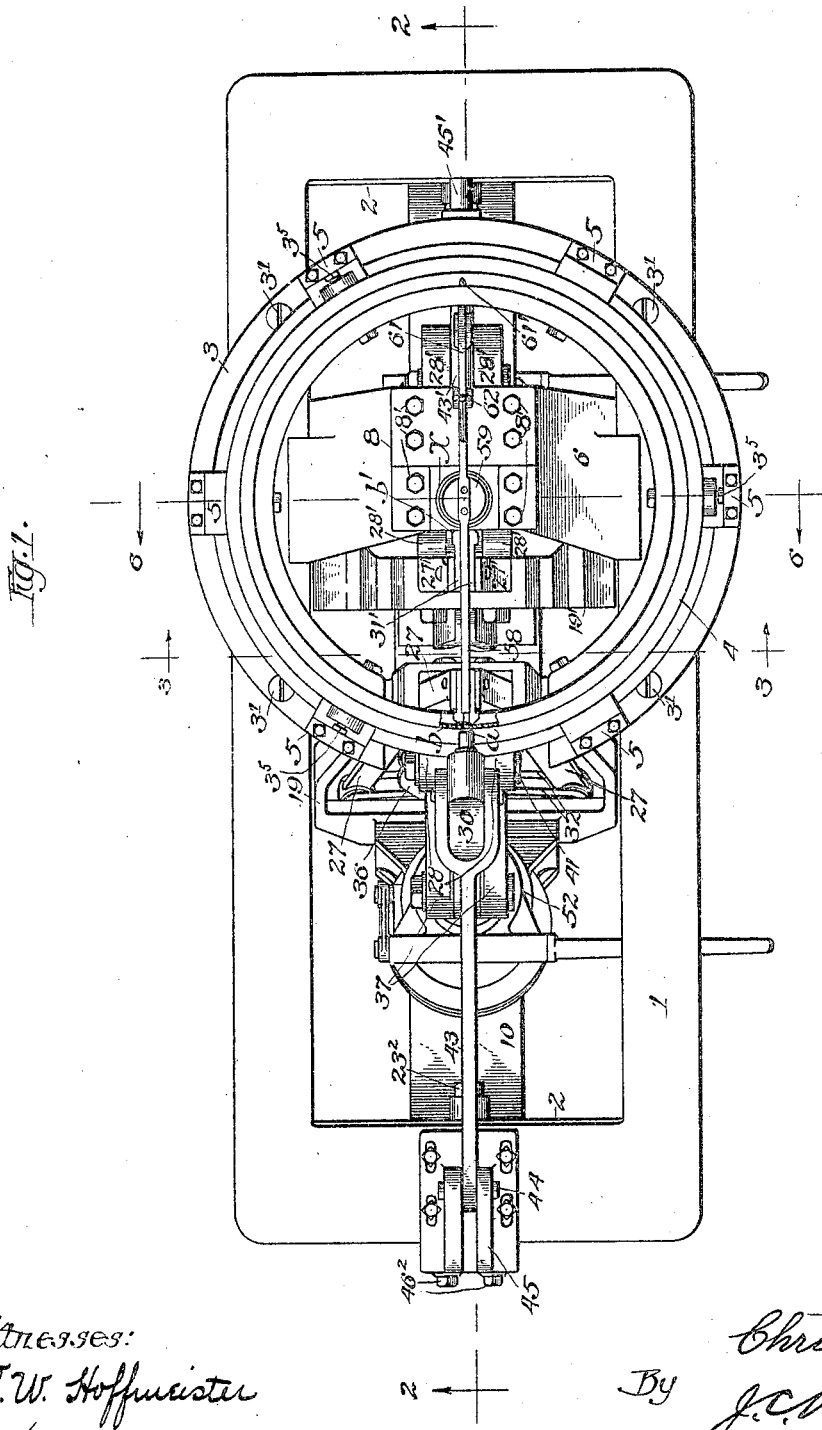
Witnesses:
F. W. Hoffmeister
T. H. Alfredo.
Inventor:
Chris Borg
By J. C. Warnes,
Attorney.

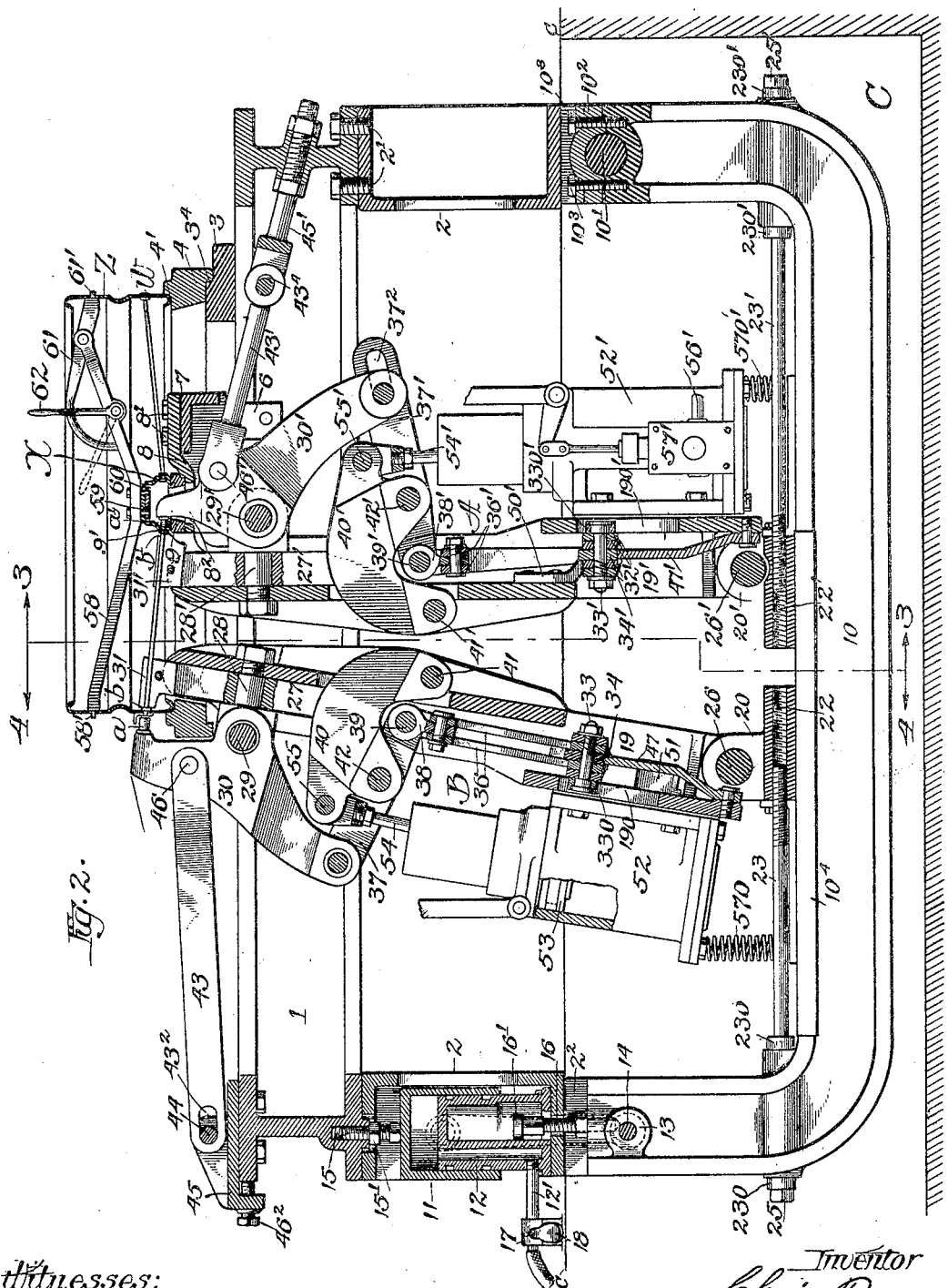

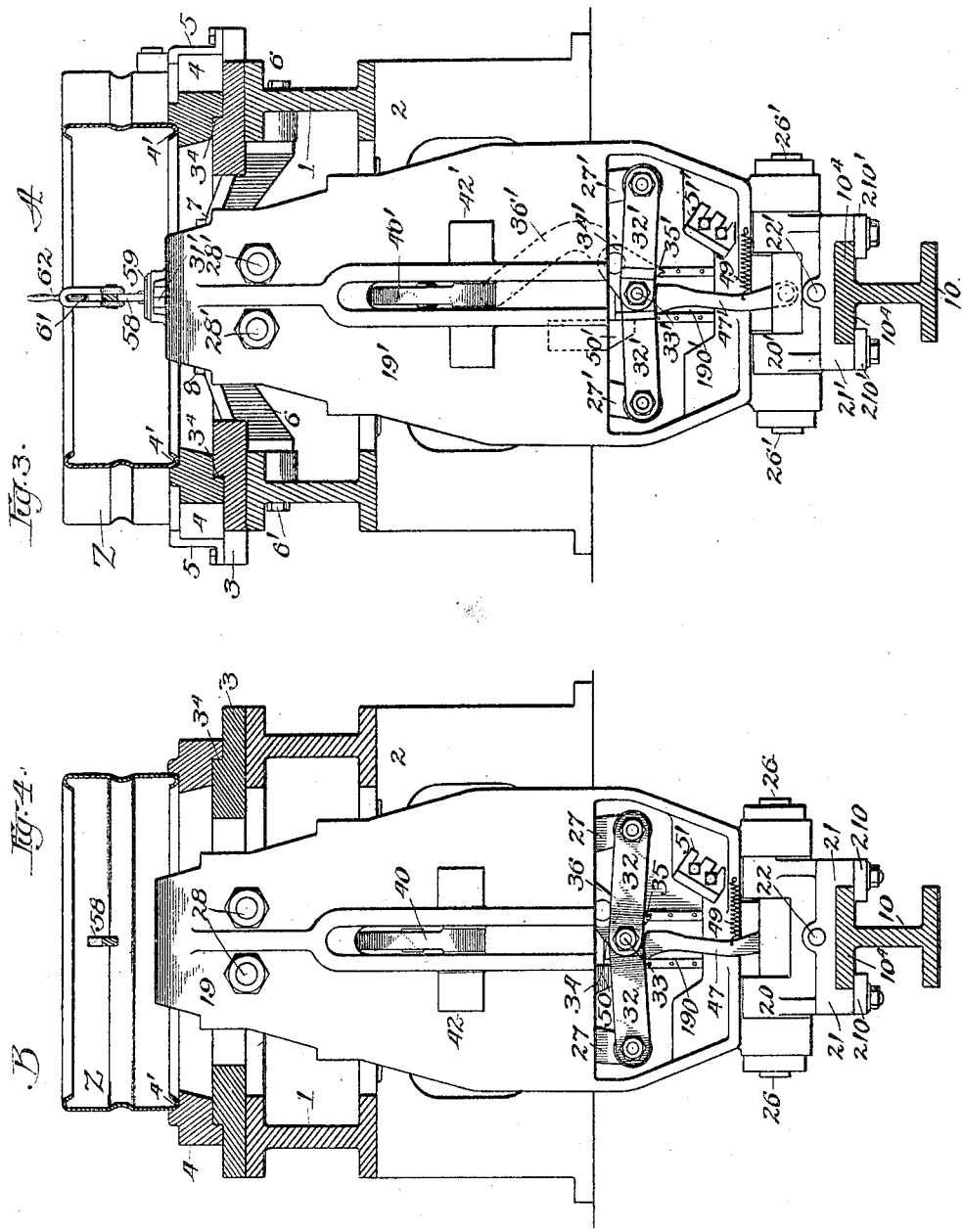

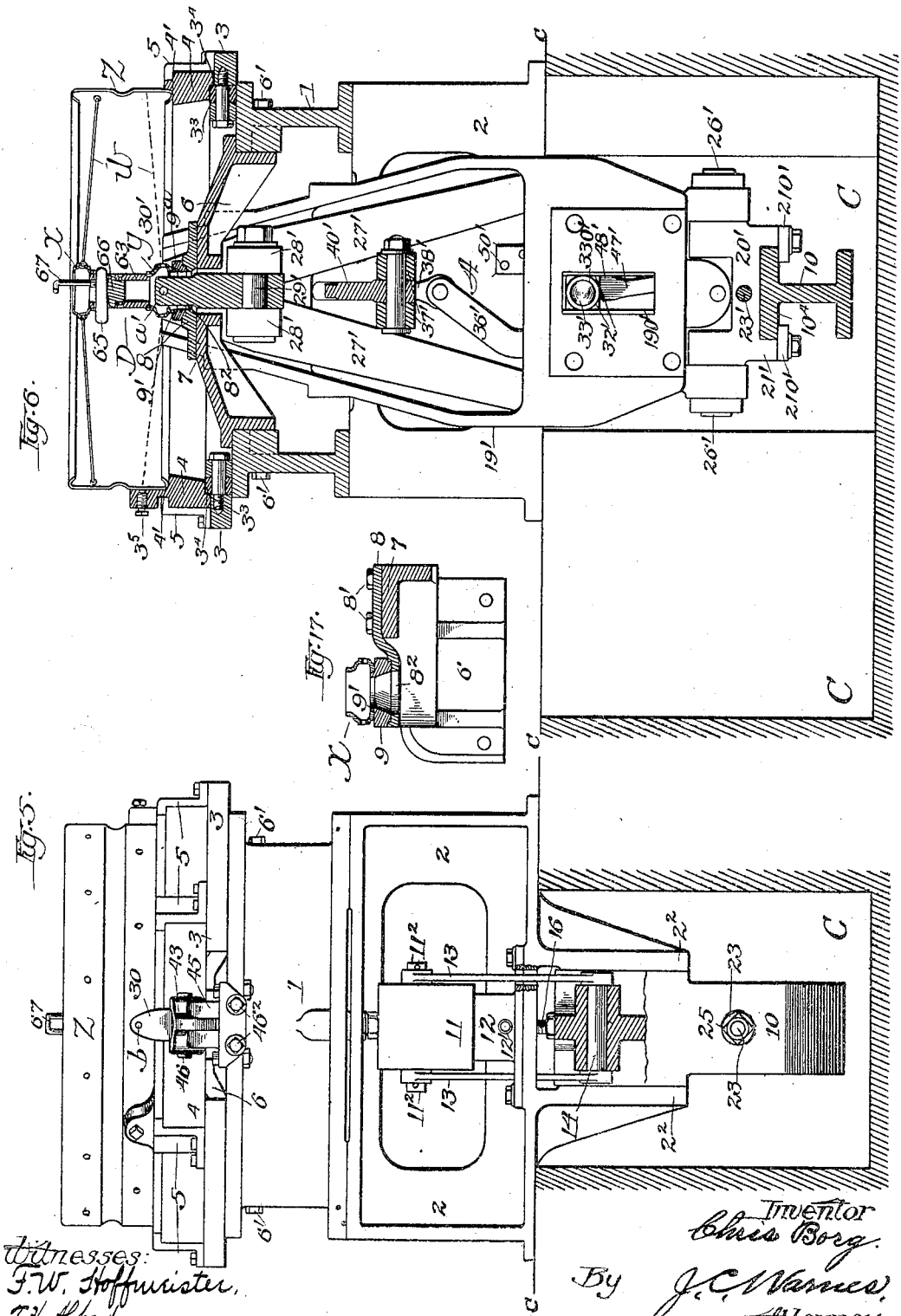

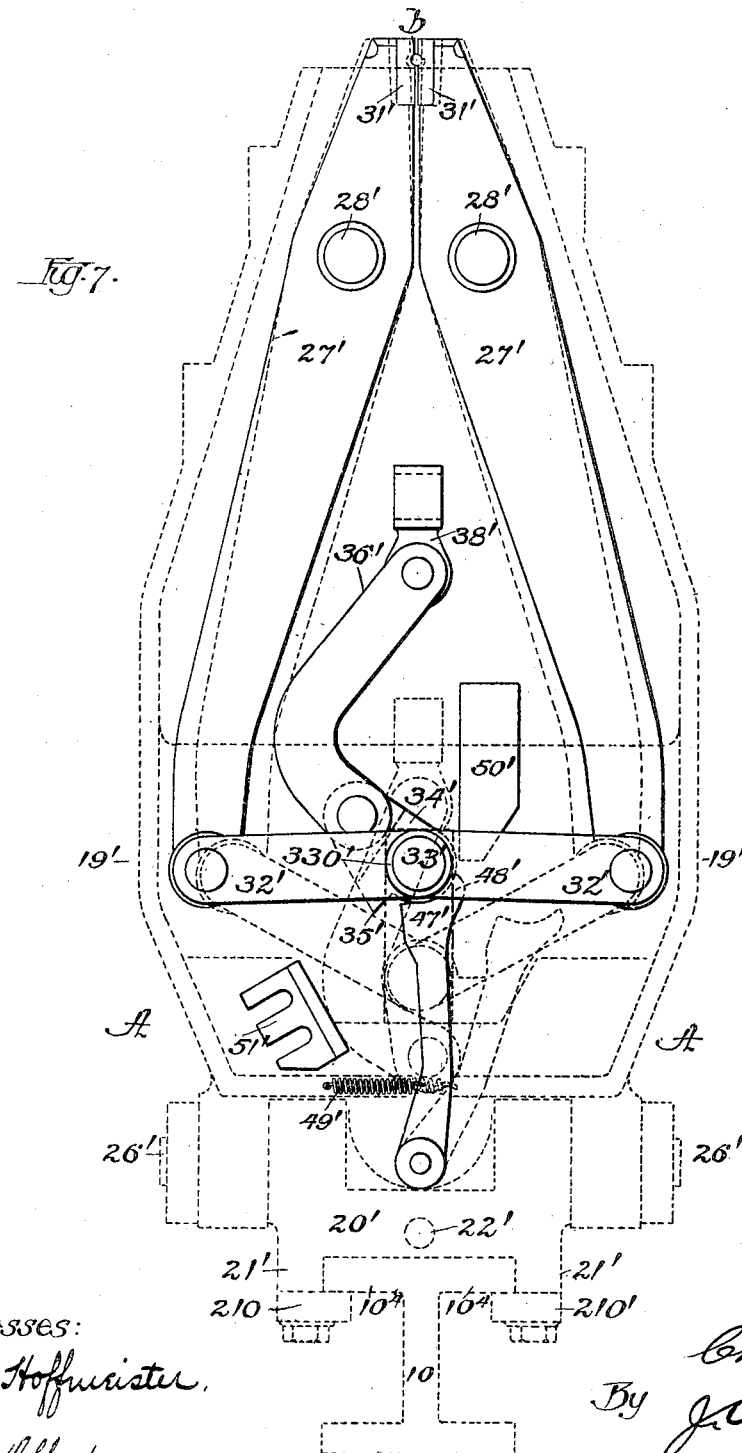

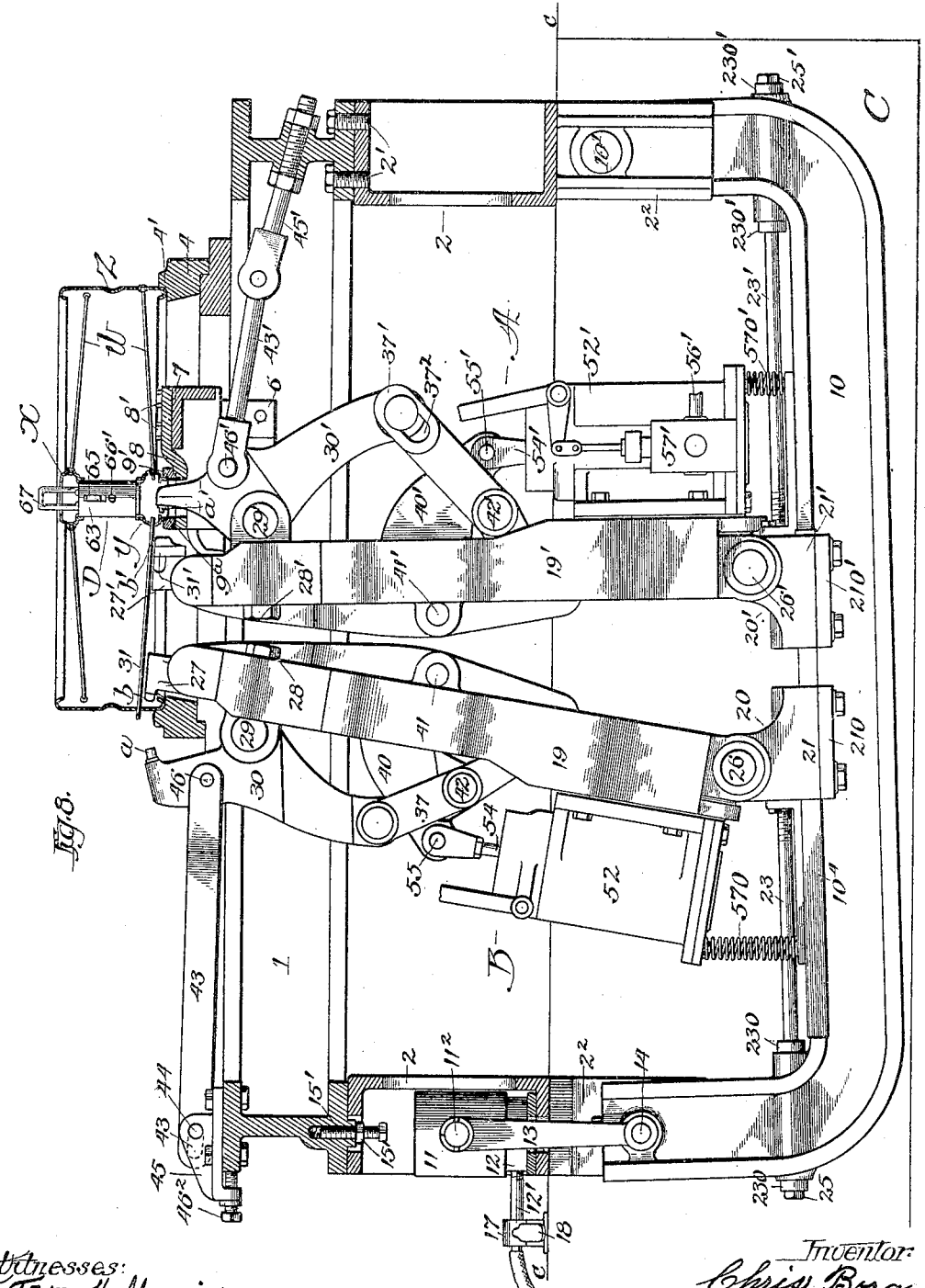

No. 807,539. PATENTED DEC. 19, 1905.
C. BORG.
MACHINE FOR MANUFACTURING METAL WHEELS.
APPLICATION FILED DEC. 21, 1904.

8 SHEETS—SHEET 7.

Witnesses:
F. W. Hoffmeister
T. H. Alfredo

Inventor:
Chris Borg
By J. C. Varnes
Attorney

No. 807,539. PATENTED DEC. 19, 1905.
C. BORG.
MACHINE FOR MANUFACTURING METAL WHEELS.
APPLICATION FILED DEC. 21, 1904.
8 SHEETS—SHEET 8.
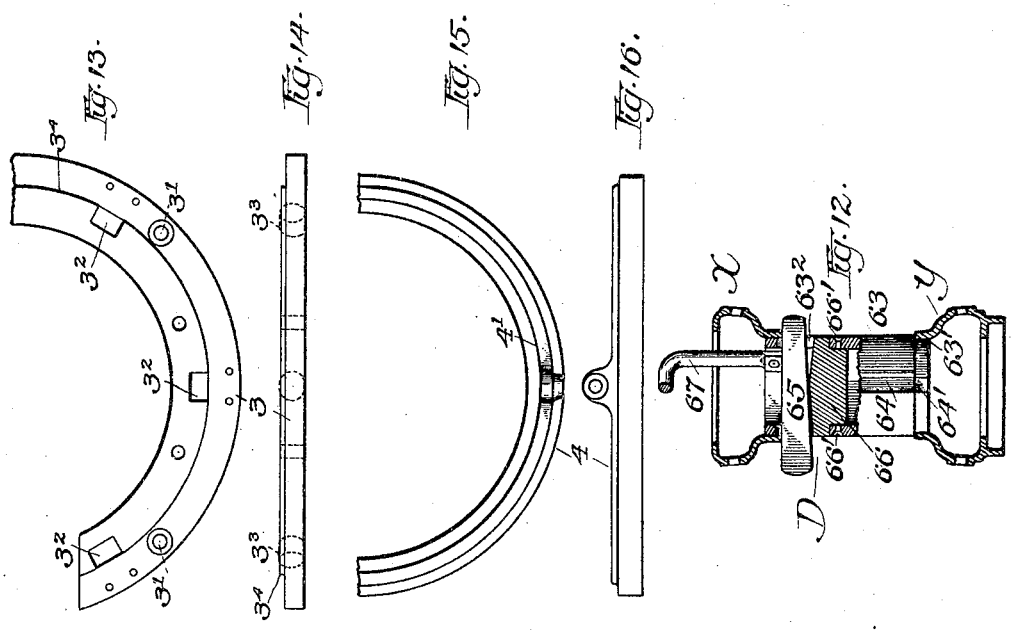
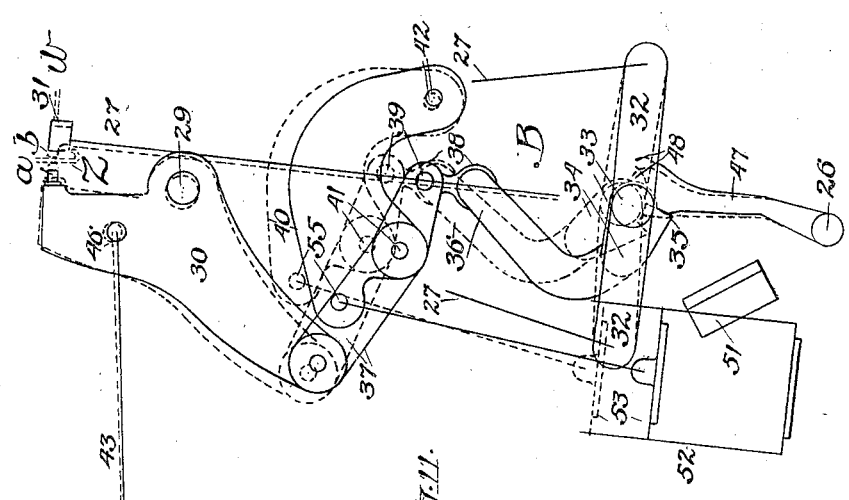
Witnesses:
F. W. Hoffmeister
T. H. Hynds
Inventor:
Chris Borg
By J. C. Warnes,
Attorney.

UNITED STATES PATENT OFFICE.

CHRIS BORG, OF CHICAGO, ILLINOIS, ASSIGNOR TO INTERNATIONAL HARVESTER COMPANY, A CORPORATION OF NEW JERSEY.

MACHINE FOR MANUFACTURING METAL WHEELS.

No. 807,539.     Specification of Letters Patent.     Patented Dec. 19, 1905.

Application filed December 21, 1904. Serial No. 237,739.

*To all whom it may concern:*

Be it known that I, CHRIS BORG, a citizen of the United States, residing at Chicago, in the county of Cook and State of Illinois, have invented a new and useful Improvement in Machines for Manufacturing Metal Wheels, of which the following is a complete specification.

This invention relates to machines used in the manufacture of metal wheels, and more especially to that portion of such machines which is designed to secure the spokes to the hub and rim of the wheel. Devices of this class as heretofore constructed have been more or less objectionable, in that they are not adapted to secure the spoke to the other members of the wheel without having a shoulder or an upset end previously formed on the spoke-blank. Furthermore, such machines, which have united both ends of the spoke in a single operation, have been complicated and expensive.

The object of this invention is to provide a spoke-fastening machine which shall be economical of manufacture, durable in construction, and efficient in operation and which can be readily employed in the manufacture of metal wheels of various sizes and of various degrees of angular deflection of the staggered spokes usually common to such class of wheels.

A further aim of the invention lies in the novel construction and arrangement of the spoke-fastening devices, whereby a plain spoke-blank may without any preliminary operation performed thereupon be secured to the other members of the wheel, and in the process of such securement the spoke-securing devices will not only form shoulders outside the hub and inside the rim and heads on both ends of the spoke, but will also stretch the spoke. It is found very desirable to stretch the spoke while effecting its securement, since it is a well-understood property of steel that the stretching or wire-drawing will favorably affect both its tenacity and its range of elastic action, so that a stretched spoke will be both better able to resist tensional stress applied thereto or the shocks to which it will be subjected incident to its use.

The use of a machine having the above-described characteristics will also result in the manufacture of a tension-wheel the spokes of which are in uniform stress and the outline of which is a true circle. In addition to this further economy is effected, since Bessemer instead of open-hearth steel can be employed for the spoke-blank and also a high-carbon, and consequently stronger, steel can be used.

To this end the spoke-securing devices at the inner and outer end thereof are independently actuated, independently adjustable, and both devices have, in addition to their clamping and upsetting movement, a movement longitudinal of the spoke and also a movement bodily to and from an operative position.

Other subordinate objects will appear in the disclosure of this invention and in the appended claims.

Figure 9:
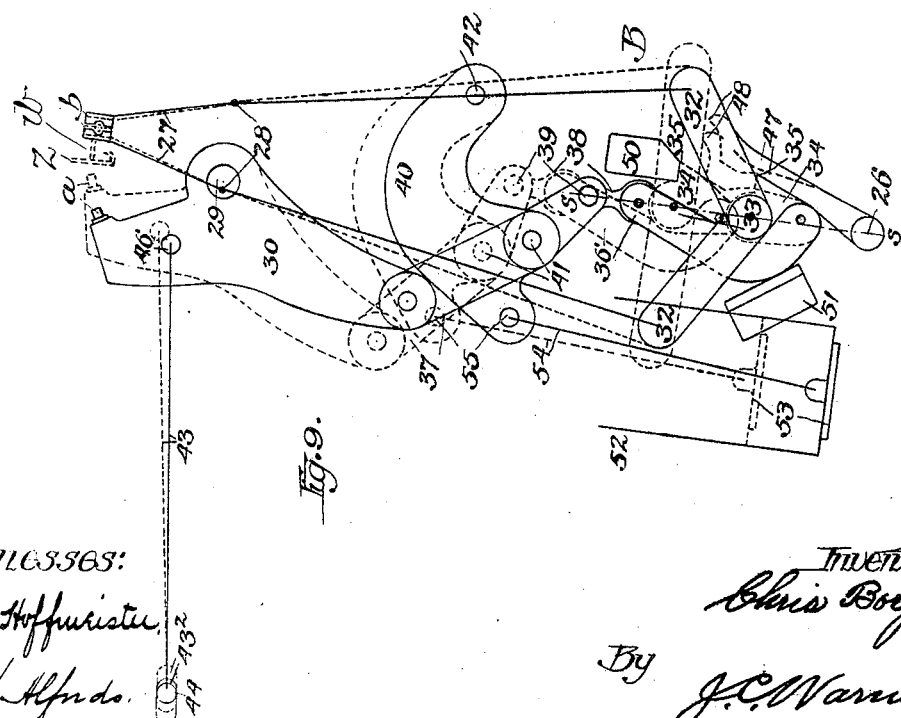

Referring to the drawings, Figure 1 is a plan view of the complete machine. Fig. 2 is a central longitudinal section of the same, taken as indicated by the line 2 2 in Fig. 1 and in which the rim is shown in place with the lower set of spokes being secured thereto, while the spoke-fastening devices are shown in the position which they occupy after having secured the spoke to the rim and hub. Fig. 3 represents a transverse section of the machine, taken as indicated by the line 3 3 on Figs. 1 and 2, while Fig. 4 represents a similar transverse section taken on the same line, but in the opposite direction. Fig. 5 is an elevation of the left-hand end of the machine viewed as in Fig. 2 and designed to illustrate the construction of the mechanism for raising and lowering the yoke which carries the spoke-fastening devices. Fig. 6 represents a transverse vertical section of the machine, taken central of the wheel and hub support, as indicated by the line 6 6 in Fig. 1. Fig. 7 may be regarded as a partial view of the reverse side of either Figs. 3 or 4 and is designed to show the construction of the spoke-gripping jaws, the levers by means of which they are actuated, and the stops which limit and control the movement of said levers, the frame carrying said gripping-jaws and the adjacent frame of the machine being shown in dotted lines. Fig. 8 is a view corresponding with that shown in Fig. 2, but with the yoke and the spoke-fastening devices which are carried thereon moved away from the wheel members and to an inoperative position. Figs. 9, 10, and 11 represent views, partly diagrammatic, of the rim and spoke-fastening device, showing the spoke-gripping jaws and the upsetting-tool with the piston for actuating same. These views are designed to illustrate the relative movement and positions of the several parts in the various stages of the operation thereof. Since the gripping-jaws in their gripping movement operate in a plane transverse relative to the plane of movement of the upsetting-tool and also transverse relative to the rocking movement of the device as a whole, the said jaws have been turned to a plane coincident with the plane of movement of the other parts and which is coincident with the plane of the paper. To avoid confusion of lines, the gripping-jaws are indicated in their transposed position by two single straight lines with black dots for their pivotal points and dies shown on their upper end. In Fig. 9 the full lines indicate the position of the various parts when moved to an operative position, but before the jaws have gripped the spoke, while the dotted lines in this view represent the relative position and extent of movement of the same parts after the jaws have closed upon the spoke. The full-line position in Fig. 10 corresponds to the dotted-line position of Fig. 9, while the dotted lines in this figure indicate the relative position and extent of movement of the various parts after the spoke has been gripped and movement of the gripping-jaws longitudinal of the spoke is impending. Fig. 11 indicates in full lines the dotted-line position of Fig. 10, while the dotted lines in this figure indicate the position of the parts after the spoke has been secured to the rim. Fig. 12 is a detached view, partly in section, of the mandrel for supporting the two-part hub, the hub being shown in position thereon. Figs. 13 and 14 represent a half plan and a side elevation, respectively, of the tire-ring support. Figs. 15 and 16 represent a half plan and side elevation, respectively, of the tire-ring; and Fig. 17 represents a fragmentary vertical longitudinal section taken through the hub-holder bracket, the hub-holder plate secured thereto, and one member of the hub resting upon said plate.

In the drawings, 1 designates the main frame of the machine and consists of an open casting having a rectangular form, the sides and ends being of an I-shaped cross-section. The ends of this frame rest upon the standards 2 2 and are secured thereto by the cap-screws $2'$. On the top of the main frame 1 is secured, by means of the bolts $3'$, the tire-ring support 3, in which are formed the mortises $3^2$, (see Figs. 13 and 14,) these mortises being, preferably, six in number. In these mortises are placed the rollers $3^3$, the upper peripheries of which extend a slight distance above the upper surface of said tire-ring support. An offset or shoulder $3^4$ is also provided in the said support, which shoulder forms a guide to effectually prevent lateral movement of the tire-ring 4, this being correspondingly formed to fit over the said shoulder on the support. The tire-ring 4 rests upon the rollers $3^3$ and is free to turn or rotate thereon and is prevented from upward movement by the Z-shaped clamps or brackets 5, as shown in Figs. 5 and 6. On the upper surface of the tire-ring is formed the annular recess $4'$, in which is placed the rim Z of the wheel under construction. To secure the rim in place on the tire-ring support while the spokes are being secured thereto, the set-screws $3^5$ (three being shown) are employed, and to hold the tire-ring 4 fixed relative to the tire-ring support 3 one of the Z-shaped brackets 5 is made somewhat shorter, so that on being tightened and brought down to said support it will clamp the two members together.

While being operated upon the hub of the wheel is held in place by the following means: A bracket 6 extends transversely across and is secured to the sides of the main frame 1 by the cap-screws $6'$, as clearly shown in Fig. 6. This bracket has a raised portion 7 at its center, on the upper face of which is secured, by means of the bolts $8'$, the hub-holder plate 8, as shown in Fig. 17. This plate is provided with a circular opening $8^2$, with a countersunk recess at its upper edge within which fits the correspondingly-formed hub-holders 9 or $9^a$, depending upon which part of the hub is being operated upon. The upper face of each hub-holder is provided with a flange projection $9'$, said projection on the hub-holder 9 being adapted to engage the rim of the hub X while the spokes are being secured thereto, and the flange projection $9'$ on the hub-holder $9^a$ is adapted to engage the rim of the other member Y of the two-part hub during the securement of the second tier of spokes.

Having briefly described the rim and hub support, the spoke-fastening devices will now be considered. These devices consist of independently-actuated and independently-adjustable means carried to and from an operative position by the yoke-bar 10. The spoke-fastening device operating upon the hub end of the spoke will be designated as a whole by A, while the spoke-fastening device operating upon the rim end of the spoke will be designated by B. The riveting-die operating within the hub is designated by $a'$ and the die on the gripping-jaws adjacent to the hub by $b'$. The riveting-die which forms the head outside the rim is represented by $a$ and the die on the gripping-jaws adjacent to the rim by $b$.

The yoke 10, which carries the spoke-fastening devices to and from an operative position, is pivoted at one end on the shaft $10'$, this shaft being secured in the depending brackets $2^2$ on the standard 2, while the axis of this shaft lies in a plane parallel with the plane of the wheel or transverse with respect to the axis of the hub. The weight on this end of the yoke is received by the cap $10^2$, which engages said shaft and is secured to said yoke by the cap-screws $10^3$, as shown in Fig. 2.

In order to place the machine at a height in which the wheel under construction will be conveniently accessible to the operator, the yoke and a portion of the spoke-fastening devices are preferably placed within the pit C, with the floor-level substantially coincident with the line $c\ c$. On the yoke 10 are adjustably supported the spoke-fastening devices A and B. The said yoke is caused to rise and fall by means of the cylinder 11, which is free to rise and fall upon the fixed piston 12. The links 13 connect the cylinder 11 with the free end of the yoke 10, as clearly indicated in Figs. 2 and 5, the studs $11^2$ on said cylinder receiving the upper ends of the links, while the pin 14 engages the lower ends of said links, said pin being received in a suitable bearing in the upturned end of the yoke. The free end of the yoke in this manner is caused to rise and fall, carrying with it the spoke-fastening devices A and B mounted thereon, the movable end of the yoke being guided between the depending brackets $2^2$ on the standard 2 at this end of the machine. To regulate the extent of vertical movement of said yoke, the cap-screw 15, with a lock-nut 15', is provided and made to project downward from the main frame 1 and is so arranged that the head thereof will be impinged by the upward-moving cylinder 11. To limit the downward movement of same, the adjustable cap-screw 16 is secured to the yoke 10 and so arranged that the head 16' thereof will engage the lower flange of the standard 2, through which the cap-screw passes, and thereby prevent further movement of the yoke in a downward direction. The pipe 12' admits air under pressure through the piston 12 into the cylinder 11 to raise and lower the yoke, admission to this pipe being controlled by the valve 17, which is actuated by the lever 18.

The spoke-fastening devices are practically of a duplicate form, and hence a description of the device B, which operates upon the rim end of the spoke, will suffice for the device A, which operates upon the hub end of the spoke. Attention will subsequently be directed to the slight variations which occur in the construction of the latter device. The several parts in the device A will be designated by the corresponding numerals primed, which designate like parts in the device B.

The device B consists, essentially, of a frame 19, pivotally mounted on the sliding stand 20, which is made longitudinally adjustable on the yoke 10, the pivoted axis of said frame upon the stand being arranged parallel with the pivotal axis of said yoke and both of said axes extending transversely of the axis of the wheel-hub or parallel with the plane of the wheel. The stand 20 is provided with the downward-projecting lateral flanges 21, which engage the way $10^4$, formed on the upper face of the yoke 10. On the under side of the flanges 21 are secured the gibs 210, which hold the said stand upon the way $10^4$. A threaded opening 22 is also provided in the stand, this opening engaging the threaded rod 23, by means of which longitudinal adjustment of the said stand is effected on the said way $10^4$. The collars 230 on the screw-rod prevent endwise movement thereof, while the square end 25 enables the same to be turned. The pin 26 forms the pivotal bearing between the frame 19 and stand 20 and, as before stated, is parallel with the shaft 10.

On the frame 19 (see Figs. 2, 4, 6, and 7) are pivoted the levers of the spoke-gripping jaws 27, which for convenience will hereinafter be termed the "spoke-gripping jaws," the bearings thereof being formed by the eyebolts 28. A pin 29 is received by the heads of the eyebolts 28, on which pivots the heading-tool 30. The upper end of the spoke-gripping jaws 27 terminate in a recessed portion 31, in which is secured the die $b$ before mentioned, while on the engaging end of the heading-tool is secured the riveting-die $a$.

The above-described arrangement will result in the heading-tool being caused to operate in a plane lying intermediate of and symmetrical with respect to the two gripping-jaws. To the lower end of the gripping-jaws 27 is secured a toggle connection consisting of the double links 32, as shown in Figs. 3, 4, and 7, two links being secured to the lower end of each lever, while the inner ends of the two opposing pairs are pivotally connected by the pin or bolt 33. Journaled on this pin on the end adjacent to the back of the frame 19 is the roller 330, which projects into the vertically-extending slot 190, formed in said frame, the object being to insure both gripping-jaws opening and closing uniformly. Journaled also upon this pin 33 intermediate of the links 32 is the short trip-link 34, provided with the laterally-projecting shoulder 35, the office of which will be hereinafter explained. The laterally-arranged bent links 36, which are also double, pivotally connect with the said trip-link 34, one on either side thereof, as clearly shown in Fig. 2. The upper end of these curved links connect with the lower end of the lever 37, and in order to provide an articulation which shall be universal the connection is effected by means of a short strap 38, having an eye therein which lies between and engages the pin 39 in the levers 37. These levers 37 are also arranged in pairs or double, so that the said eye 38 journals on this pin and lies between the two links of the lever. The other ends of the levers 37 pivotally connect with the lower end of the heading-tool 30.

To the frame 19 of the spoke-fastening device is pivotally attached the walrus-shaped link or arm 40, the pivotal axis being formed by the pin 41. Near the free end of this arm 40 a pivotal connection is effected with said double link 37, the pin 42 forming the axis of this connection. The arm 40 and the double link 37 may be regarded as a set of links, which are arranged to form a toggle-link connection between the frame 19 of the spoke-fastening device and the lower end of the upsetting-tool 30, while the curved links 36, with the trip-link 34 and the strap 38, constitute a flexible connection between the two sets of toggle connection.

It is apparent that the pivotal bearing of the links 37 with the arm 40 in its movement will be limited to a circular arc whose center is coincident with the center of the pin 42, while the movement of the upper and lower links will be determined by the path of movement of the connecting-arm of the heading-tool 30. In this manner the arm 40 not only constitutes one of the elements of the toggle-link connection, but also controls the movement thereof.

Near the upper end of the heading-tool 30 is pivotally connected the arm or link 43, the outer end thereof being provided with the slot 43², which is made to engage the pin 44 on the adjustable casting 45. The adjustment of this casting is effected by means of the set-screws 46². The inner end of the link 43 is forked, the forked end engaging the heading-tool by means of the pin 46. The function of this arm or link 43 is to control the movement of the heading-tool and spoke-gripping jaws, and at a certain stage in the movement thereof its connection therewith forms a new pivotal center, about which the said heading-tool moves and toward which the said gripping-jaws approach, as will be hereinafter more fully explained.

Pivoted at the lower end of the frame 19 and arranged to swing in a plane coincident with the plane of movement of the gripping-jaws is the post 47, provided with an upper curved end 48, as clearly shown in Fig. 7. When the gripping-jaws are closed and the links 32 are made to extend horizontally, the spring 49 will pull said post inwardly to substantially a vertical position, in which position its upper curved end 48 will be forced inwardly and caused to engage the inner end of the link connections, and thereby lock or prevent the downward movement of same. The shoulder 35 of the short trip-link 34 on the downward movement of the curved links 36 will be made to impinge the upper end of this post 47 and trip or disengage it from its locked position, after which the said links will be free to move downward, and thereby effect the release of the gripping-jaws. The stop 50 is so arranged that the said shoulder 35 on the trip-link 34 in the upward movement thereof in connection with the curved link 36 will be caused to impinge the lower end of said stop and cause said link to swing to the left, as viewed in Fig. 7, or past the line connecting the centers of said post 47 and the links 32 and permit it to move to the position shown by full lines in this figure. From an inspection of Fig. 7 it will be seen that the pivotal connection between the shouldered trip-link 34 and the curved link 36 when in its downward position, as shown by dotted lines in Fig. 7, lies to the right of the center or in a locked position. Hence the above-described tripping mechanism is required in order that the trip-link may be thrown past the line of centers or from its locked position before the said trip-link 34 is free to swing about its pivotal center.

51 designates the guide which deflects the curved link 36 and the trip-link 34 past the line of centers and to a locked position in its downward movement, as clearly indicated by Figs. 7 and 9. It is thus seen that the curved link 36, the trip-link 34, and the strap-eye 38 together form a flexible connecting means between the two toggle-link connections, which becomes extensible when the said trip-link is forced past the line of centers in the upward movement thereof.

Movement is imparted to the heading-tool and gripping-jaws by the following means: On the side of the gripping-lever frame 19, near the lower end thereof, is secured the cylinder 52, which is arranged to rock with the said frame. A piston 53 fits within this cylinder and through the piston-rod 54, which connects with the walrus-shaped link or arm 40, communicates motion to the heading-tool and the gripping-jaws by means of the lever 37 and the above-described flexible extensible connecting means. The connection between the piston-rod 54 and the arm 40 is effected, preferably, at a point lying beyond and above the pivotal connection of said arm with the said levers 37, said connection being effected by means of the pin 55. The novel result obtained by this system of links and levers is due to the peculiar relation of their pivotal centers and the relative lengths of said levers, as will be more fully set forth in the description of the operation thereof.

Air is introduced into the cylinder 52 through the pipe 56, and its introduction is controlled by means of the valve mechanism 57, the details of which are not shown, nor are the levers shown by which it is controlled, since any simple valve mechanism controlled by any suitable means will answer the purpose.

In order to cause the spoke-fastening devices to move away from the work after the end of the spoke has been secured to its adjacent wheel member, the spring 570 is placed between the outer end of said cylinder 52 and the supporting-yoke 10. This spring 570 exerts a constant tendency to rock the spoke-fastening device B toward the center of the wheel being operated upon, while the spring 570' operates similarly to rock the spoke-fastening device A away from the hub of the wheel.

It will be observed from an inspection of Fig. 2 that the heading-tool which enters the hub is of a somewhat different shape from the one which operates upon the rim end of the spoke. This of course is required because of the fact that this tool must operate in a comparatively small space, and hence with very limited movement. This limited movement is provided for by the slots $37^2$ in the end of the links $37'$, which will result in only a sufficient amount of movement being imparted to the heading-tool which operates within the hub to effect the upsetting of the spoke therein. A short slot $43^4$ is formed in the link $43'$, the function of which is to permit a limited movement of the upsetting-tool about the pivotal axis formed by the pin $29'$ and at the proper time afford a new pivotal bearing therefor about the pivotal axis formed by the pin $46'$, as the link 43 and slot $43^2$ permit movement of the heading-tool 30 first about the pin 29 and afterward about the pin 46. The link $43'$ for controlling the movement of the rim-end heading-tool and the slot $43^4$ corresponds with the slot $43^2$, the latter being made, however, correspondingly shorter, owing to the limited movement of the hub-end heading-tool. The adjustable casting 45 for supporting the outer end of the link 43 has its counterpart in the adjustable eyebolt-bearing $45'$ for supporting the outer end of the link $43'$. This difference in construction is immaterial, however, as the form shown was preferred in order to avoid interference with the wheel-tire ring.

In the type of wheel upon which this machine is shown to be operating a two-part hub is used, the component parts being subsequently secured by a suitable sleeve. (Not shown.) The portion of the hub first secured is shown in place in Fig. 2 and will be designated by X, while the portion last secured will be designated by Y, the rim by Z, and the spokes by W. In order to secure the portion X of the hub in place upon the hub-holder 9, the following-described hub-fastener is employed: A spring-bar 58 is provided, being depressed in its central position and having secured to the lower side of said depressed portion a circular plate 59, which enters the end of the hub, and the circular plate 60, of somewhat larger diameter, which forms a bearing pressing upon the end of the hub, all of which are clearly shown in Fig. 2. One end of the spring-bar 58 is provided with a reduced end $58'$, adapted to engage one of the spoke-receiving apertures in the rim Z. Near the opposite end of the spring-bar 58 is pivoted the small lever 61, the outer end of which is provided with a reduced end $61'$, similar to the reduced end $58'$ on the spring-bar 58. The inner end of the lever 61 is bent to substantially a circular form, with the free end deflected toward the said spring-bar 58. It will be manifest from an inspection of the device, as shown in Fig. 2, that when the reduced ends $58'$ and $61'$ are inserted in the oppositely-disposed spoke-receiving apertures for the upper tier of spokes and the lever 61 is brought down until its free end rests against the lever 58, the circular plates 59 and 60 having been engaged by the end of the hub X, the hub will be securely held in place. To secure the said lever 61 in this position, the hand-lever 62 is provided, this hand-lever being divided below the handle portion thereof and made to straddle both the said lever 61 and spring-bar 58 and is pivotally mounted upon the spring-bar 58 at a point substantially coincident with the center of curvature of the bent end of the lever 61. It will thus be seen that by moving this hand-lever 62 to the right, as viewed in Fig. 2, the lever 61 will be locked and the device as a whole will be held securely in place. To release the same, the said hand-lever 62 is moved to the left, as shown by dotted lines in the same view, after which the lever 61 may be raised, which will shorten the effective length of the bar and enable it to be removed.

The above-described device secures the lower hub member in place during the process of securing the lower tier of spokes. In securing the second or last tier of spokes the hub portion Y is held by the mandrel D, as shown in the general view in Fig. 8 and in detail in Fig. 12. This mandrel D consists of a sleeve 63, provided with the shoulder $63'$ at its lower end and the diametrically-opposed slots $63^2$ near its upper end. The key 64 is provided, being secured in a keyway in said sleeve. This key is reduced in thickness at that portion extending over the shoulder $63'$, and this reduced portion, which may be designated as $64'$, fits into the corresponding keyway in the hub Y, while the upper end of said key 64 is received by the keyway in the first secured portion X of the hub. The first secured portion of the hub rests upon the tapered key 65, this key passing through the slots $63^2$ in the sleeve and being supported by the crown-shaped support 66, the ends of which also rest in the said slot $63^2$, while that portion within the sleeve extends below the slots and is secured by means of the screws $66'$. A handle 67 enables the mandrel to be withdrawn from the hub after the key has been withdrawn from the mandrel. This device insures both portions of the two-part hub being held at the proper distance apart while the second tier of spokes is being secured thereto, the tapered key 65 providing for adjustment of the distance between the two parts X and Y of said hub. The key 64 insures the keyways of both portions of the hub registering exactly with each other.

Before the operation of the machine as a whole will be considered a description will be given of the operation of one of the spoke-fastening devices. In this connection reference will be had to Figs. 9 to 11, inclusive, in which, as before set forth, the operation of the several elements is made to appear in a common plane—i. e., the plane of the paper, as before explained. The corresponding parts are marked with their proper designating-numerals, whether shown in their real or in their transposed positions and also whether shown in actual form or their diagrammatic outline.

Assuming that the spoke-fastening device B has been moved to an operative position, the full lines in Fig. 9 will indicate the position of the various parts before movement begins. The dotted lines in this figure indicate the position and extent of movement of the various parts after the gripping-jaws 27 have been closed. It will be seen that the axis of the pivotal connection between the curved link 36 and the trip-link 34 lies to the right of the line of centers s s, and hence locked, since being past the center and restrained from further movement to the right by the said curved link bearing against the pin 33 lateral motion in either direction will be impossible. The first movement imparted to the link 36 will therefore be directed to bringing the links 32 to their dotted-line position, their outer ends, which connect with the lower ends of the gripping-jaws 27, moving outward, and thereby causing the said jaws to grip the spoke. Just before this movement of the links 32 is completed the shoulder 35 on the trip-lever 34 impinges the stop 50, thus causing the lower end of said lever to swing about its bearing to the left, as viewed in Fig. 9, and past the line of centers s s, as shown in said figure. From this position further movement of the piston 53 will operate to swing the trip-lever about its center, the gripping-jaws remaining stationary and gripped, while the flexible connection formed by the said curved link 36, the trip-lever 34, and strap-eye 38 will be enabled to extend an amount sufficient to provide for the required continued movement of the other parts, the swinging of the trip-lever about the pin 33 permitting of said extension. As the links 32 are raised the spring 49 pulls the arm or post 47, with its curved end 48, to a position beneath the pin 33, in which position the toggle-link connection is prevented for the time from returning.

Referring now to Fig. 10, continued upward movement of the piston 54 will move the parts from the dotted-line position of Fig. 9, which corresponds with the full-line position of Fig. 10, to the dotted-line position of Fig. 10. During this movement, as before stated, the gripped jaws remain stationary while the heading-tool 30 is made to move nearer to its work. The extent of movement shown in this figure is sufficient to bring the outer end of the slot $43^2$ into engagement with the pin 44. It is manifest that when longitudinal movement of the bar 43 is prevented by this slot engaging the said pin then no further movement of the heading-tool 30 can take place about the pivotal axis formed by the pin 29; but since, however, the pin 29 and the frame 19, to which it is secured, are movable about the pin 26 further movement will be possible. The further movement will, however, cause the heading-tool 30 to move about the pin 46 as its new pivotal center, the pin 29 of said heading-tool revolving about this new center and carrying with it the entire frame of the spoke-fastening device and with it of course the gripping-jaws 27. The bar 43 thus controls the movement of the free or upper end of the spoke-fastening device and becomes effective in its control when the dotted-line position of Fig. 10 is reached. Movement of the frame, as above stated, carrying the spoke-gripping jaws and the heading-tool is now pending, and reference to Fig. 11 will make apparent the extent of such required movement of the frame and gripping-jaws. In this figure the dotted-line position is shown comparatively close to the full-line position, the full-line position in this figure corresponding with the dotted-line position in Fig. 10. It is seen in Fig. 11 that the spoke-gripping jaws carried with the frame move longitudinally of the spoke, and the upper end of the heading-tool is made to also move toward the gripping-jaws 31 about the pin 46 and an amount as indicated by the dotted lines in this figure. Since the pin 29 is made to rotate about the center formed by the pin 46, the last-mentioned pin will be caused to rise slightly while the said pin 29 moves about the pivotal center of the frame, which is formed by the pin 26. From an inspection of Figs. 9 to 11, inclusive, it will be seen that the initial movement of the piston causes comparatively rapid movement of the heading-tool 30 as well as of the gripping-jaws 27. In Fig. 11 it will be observed that the pin 41, which forms the pivotal connection between the link 37 and the arm 40, is made to approach very closely to a line passing through the axis of the pivotal connection between the said links 37 with the lower end of the heading-tool 30 and the axis of the pivotal connection between the arm 40 with the frame of the spoke-fastening device, thereby securing the greatest leverage at the point in the stroke most needed.

The grip of the jaws 31 upon the spoke is sufficient to prevent slippage of the spoke therein, so that as the said jaws, which have formed on their inner ends the die $b$, are caused to move longitudinally of the spoke they will operate to upset the shoulder upon the spoke within the rim, while the heading-tool 30, with the die $a$, will form a head upon the outer end of the spoke outside the rim. The pressure is now released from beneath the piston 53, which will permit the parts to return to the position indicated in Fig. 9. In Fig. 2 is shown the position of the various elements of the spoke-fastening devices after having gripped the spoke and formed the heads and shoulders thereon adjacent to the wheel members.

In the return movement of the heading-tool and gripping-jaws with the connecting-links the curved link 36 swings the trip-lever 34 about the pin 33 until the shoulder 35 on said lever contacts the post 47 and forces it from beneath the said pin 33, after which the links 32 are free to return to their lower position. Before reaching their lower position, however, the curved link 36 impinges the stop or guide 51 and forces the axis of the pivotal connection between said curved link and trip-lever 34 to the right of the line of centers $s\ s$, as shown in Fig. 9, in which position these parts will be locked, and when again raised will immediately raise the links 32, as before described.

The detailed description of the operation of one of the spoke-fastening devices which has just been given will now be concluded by a brief general statement of the operation of the machine as a whole. The rim Z is placed upon the tire-ring 4 and is secured thereto by means of the set-screws $3^5$. A hub X is then placed upon the hub-holder plate 9 and secured thereto by means of the hub-fastening device, consisting in the main of the spring-bar 58 and the lever 61 and manipulated as heretofore described. A spoke W is then inserted in the corresponding spoke-receiving apertures of the hub and rim, and the tire-ring support, with the tire therein, moved to a position to register with the spoke-gripping jaws. The next step consists in clamping the tire-ring to the tire-ring support, which is accomplished by tightening one of the shorter clamps 5, as heretofore explained. The mechanism will then occupy the position shown in Fig. 8. Pressure is then admitted to the cylinder 11 through the piston 12, the pipe 12', the valve 17, and the lever 18. This will cause the yoke 10 to rise, carrying with it the spoke-fastening devices A and B. By means of the cap-screw 15' the extent of the upward movement of said devices is so regulated that the gripping-jaws will rise to a suitable height to come in line with and engage the inserted spoke W of the wheel, the said spoke having first been previously heated before being slipped within the corresponding apertures in the hub and rim. The stands 20 and 20', carrying the supporting-frames of the spoke-fastening devices B and A, respectively, are so adjusted that the gripping-jaws are made to assume the proper angle relative to the spoke, this adjustment being effected by means of the screw-rods 23 and 23', respectively. Both the spoke-fastening devices A and B, which are adapted to operate upon the hub and rim end of the spoke, respectively, are now in place, and either one can be caused to operate first, or their operation might be effected simultaneously if both levers were simultaneously operated. It is preferred, however, to operate the hub end device A first. To do this, pressure is admitted to the cylinder 52', which causes the spoke-gripping jaws to grip the spoke a slight distance from the hub, after which the said jaws are caused to move longitudinal of the spoke, while the heading-tool 30' impinges the end of the spoke within the hub. In this movement the gripping-jaws 31', with the die $b'$ and the heading-tool 30', approach each other, upsetting the metal outside the hub to form a collar adjacent thereto, while a head is formed on the end of the spoke within the hub by the die $a'$. The detailed operation of this device, with the continued movement of the heading-tool after the movement of the jaws has ceased, followed with the movement of the said jaws in a direction longitudinal of the spoke, has already been set forth. The gripping-jaws 31' still retaining their hold upon the spoke, the pressure is now admitted to the cylinder 52, causing the spoke-gripping jaws 31, provided with the die $b$, to grip the spoke tightly near the rim. The heading-tool 30 continues to move about the axis formed by the pin 29 until further movement thereof is restrained by the bar 43, after which the gripping-jaws, as well as the heading-tool, will be made to move in a direction longitudinal of the spoke in the manner heretofore described. The die $b$ on the gripping-jaws 31 will operate to form a shoulder upon the spoke adjacent to the rim, while the die $a$ on the heading-tool will form a head on the spoke outside the rim. The outward movement of the gripping-jaws 31 will stretch the spoke W in order to provide material for its upsetting, such stretching of the spoke involving a method which is set forth and claimed in an application filed by me November 16, 1904, Serial No. 232,922, and entitled a "Method of manufacturing metal wheels." The pressure is then relieved from the cylinders 52 and 52', the gripping-jaws are released from the spoke, and the springs 570 and 570' cause the two spoke-fastening devices to swing toward each other and to a position in which they will be free to descend. The pressure is next released in the cylinder 11, which will permit the yoke, with the spoke-fastening devices mounted thereon, to drop down to the position shown in Fig. 8, in which after loosening the clamp 5 the wheel can be turned to proper position for the securement of the next spoke. When all the spokes of the first tier have been secured to the portion X of the two-part hub, the wheel is removed and reversed for securing the second tier of spokes to the member Y of the hub. To secure the second tier of spokes, the hub-fastener is removed, the wheel having been reversed in position and again secured and the member Y of the two-part hub placed upon the hub-holder plate $9^a$, as shown in Figs. 6 and 8. The mandrel D is then placed within the hubs, as shown in this figure, after which the key 65 is inserted in said mandrel and the two parts of the hub adjusted relative to each other. The last-mentioned steps having been completed, the spokes of the second tier are secured in place in the same manner as were those in the first tier. It is found preferable, however, to start in securing the second tier of spokes at a position as nearly coincident with the starting-point in the first tier as is possible with staggered spokes and to proceed in the same direction about the circumference of the wheel. This will require the wheel in the securement of the second tier of spokes to be turned in a direction just the reverse of that in which it was turned in securing the first set of spokes.

Having thus described my invention, what I claim as new, and desire to secure by Letters Patent, is—

1. In a wheel-machine, in combination, a pivotally-mounted yoke or beam, a rocking frame pivotally mounted thereon; gripping-jaws and a heading-tool pivotally mounted on said rocking frame, the said jaws having in addition to their gripping movement a movement longitudinal of the spoke, and single means mounted also on said rocking frame for actuating the gripping-jaws and heading-tool and for effecting the movement of the jaws longitudinal of the spoke.

2. In a wheel-machine, in combination, a main frame, a spoke-fastening device comprising a rocking frame with spoke-gripping jaws and a heading-tool pivotally mounted thereon, a suitable support on which the said rocking frame is pivotally mounted, means for actuating the gripping-jaws and heading-tool, and means interposed between the said heading-tool and main frame for controlling the movement of the gripping-jaws and heading-tool in a direction longitudinal of the spoke.

3. In a wheel-machine, in combination, a main frame, a spoke-fastening device comprising a rocking frame with spoke-gripping jaws and a heading-tool pivotally mounted thereon, a suitable support on which the said rocking frame is pivotally mounted, means for actuating the gripping-jaws and heading-tool, and a bar engaging at one end the heading-tool and provided at the other end with a slot which engages a pin on the main frame, the said bar operating to control the movement of the gripping-jaws and heading-tool in a direction longitudinal of the spoke.

4. In a wheel-machine, in combination, a main frame, a spoke-fastening device comprising a rocking frame with spoke-gripping jaws and a heading-tool pivotally mounted thereon, a suitable support on which said rocking frame is pivotally mounted, means for actuating the gripping-jaws and heading-tool, and means interposed between the said main frame and heading-tool for restraining the movement of the latter about its pivotal axes with said rocking frame and for causing it to move about a new pivotal axis and thereby effect a slight rocking movement of the rocking frame with the heading-tool and spoke-gripping jaws mounted thereon.

5. In a wheel-machine, in combination, a main frame, a spoke-fastening device comprising a rocking frame, spoke-gripping jaws and a heading-tool pivotally mounted thereon, a suitable support on which said rocking frame is pivotally mounted, means interposed between said main frame and spoke-fastening device for controlling the movement of the said gripping-jaws in a direction longitudinal of the spoke, a set of links forming a toggle connection between the lower ends of the gripping-jaws, a second set of links forming a toggle connection between the lower end of the heading-tool and the said rocking frame, a link connection interposed between the first and second sets of links, and means articulating with the second set of links for actuating both the heading-tool and gripping-jaws, substantially as described.

6. In a wheel-machine, in combination, a main frame, a spoke-fastening device comprising a rocking frame, spoke-gripping jaws and a heading-tool pivotally mounted thereon, a suitable support on which said rocking frame is pivotally mounted, means interposed between said main frame and spoke-fastening device for controlling the movement of the said gripping-jaws in a direction longitudinal of the spoke, a set of links forming a toggle connection between the lower ends of the gripping-jaws, a second set of links forming a toggle connection between the lower end of the heading-tool and the said rocking frame, one of the said links in the second set having an extension thereon, connecting means interposed between said link extension and the first set of links, and means articulating with the second set of links for actuating both the heading-tool and gripping-jaws, substantially as described.

7. In a wheel-machine, in combination, a main frame, a spoke-fastening device comprising a rocking frame, spoke-gripping jaws and a heading-tool pivotally mounted thereon, a suitable support on which said rocking frame is pivotally mounted, means interposed between said main frame and spoke-fastening device for controlling the movement of the said gripping-jaws in a direction longitudinal of the spoke, a set of links forming a toggle connection between the lower ends of the gripping-jaws, a second set of links forming a toggle connection between the lower end of the heading-tool and the said rocking frame, an extensible locking-link connection interposed between the first and second sets of links, a device for breaking said extensible locking connecting means, and means articulating with the second set of links for actuating both the heading-tool and gripping-jaws, substantially as described.

8. In a wheel-machine, in combination, a main frame, a spoke-fastening device comprising a rocking frame, spoke-gripping jaws and a heading-tool pivotally mounted thereon, a suitable support on which said rocking frame is pivotally mounted, means interposed between said main frame and spoke-fastening device for controlling the movement of the said gripping-jaws in a direction longitudinal of the spoke, a set of links forming a toggle connection between the lower ends of the gripping-jaws, a second set of links forming a toggle connection between the lower end of the heading-tool and the said rocking frame, an extensible locking-link connection interposed between the first and second set of links, a device for tripping said locking-link connection, means for temporarily locking against return movement the first set of links which form the toggle connection between the gripping-jaws, and means articulating with the second set of links for actuating both the heading-tool and gripping-jaws, substantially as described.

9. In a wheel-machine, in combination, a hub-fastener comprising a centrally-depressed spring-bar, one end of which is suitably formed to engage a spoke-receiving aperture in the wheel-rim, means on the depressed portion of the spring-bar for engaging the hub, a lever pivotally mounted on said spring-bar, said lever being also suitably formed on its outer end to engage a spoke-receiving aperture in the wheel-rim, and means for locking said lever, all combined substantially as described.

10. In a wheel-machine, in combination, a hub-fastener comprising a spring-bar, and a lever pivotally mounted thereon, the said spring-bar and lever forming a toggle-joint, and each having formed on its outer end suitable means for engaging the spoke-receiving apertures in the wheel-rim, means for securing the said spring-bar and lever in a locked position, and means on said spring-bar for engaging the hub, all combined substantially as described.

11. In a wheel-machine, a rim-support consisting of a rotatable rim-ring, means for releasably securing the wheel-rim therein, a rim-ring support, and means for temporarily holding the said rim in a fixed relation with respect to its support, all combined substantially as described.

12. In a wheel-machine, a hub-supporting mandrel consisting of a sleeve provided with a longitudinally-extending key and arranged on either end to engage the component members of the two-part hub, and a transversely-extending key for supporting one of said hubs upon the sleeve, all combined substantially as described.

13. In a wheel-machine, a hub-supporting mandrel consisting of a sleeve provided with a longitudinally-extending key, the said sleeve being arranged on either end to engage the component members of the two-part hub, a handle arranged on one end of the sleeve, and a shoulder formed on the opposite end thereof, and a transversely-extending tapered key for adjusting the distance between the hub members, all combined substantially as described.

In testimony whereof I have signed my name to this specification in the presence of two subscribing witnesses.

CHRIS BORG.

Witnesses:
W. S. TYSON,
J. C. WARNES.